(12) United States Patent
Glass et al.

(10) Patent No.: US 11,645,513 B2
(45) Date of Patent: May 9, 2023

(54) UNARY RELATION EXTRACTION USING DISTANT SUPERVISION

(71) Applicant: International Business Machines Corporation, Armonk, NY (US)

(72) Inventors: Michael Robert Glass, Bayonne, NJ (US); Alfio Massimiliano Gliozzo, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 979 days.

(21) Appl. No.: 16/502,625

(22) Filed: Jul. 3, 2019

(65) Prior Publication Data

US 2021/0004672 A1 Jan. 7, 2021

(51) Int. Cl.
*G06N 3/08* (2023.01)
*G06N 5/02* (2023.01)
*G06F 16/28* (2019.01)

(52) U.S. Cl.
CPC ............ *G06N 3/08* (2013.01); *G06F 16/285* (2019.01); *G06F 16/288* (2019.01); *G06N 5/02* (2013.01)

(58) Field of Classification Search
CPC .......... G06N 3/08; G06N 5/02; G06F 16/285; G06F 16/288
See application file for complete search history.

(56) References Cited

U.S. PATENT DOCUMENTS

| | | | | |
|---|---|---|---|---|
| 7,581,170 | B2 * | 8/2009 | Baumgartner | G06F 16/9535 715/234 |
| 8,140,323 | B2 * | 3/2012 | Johnson | G06F 40/205 704/10 |
| 8,874,432 | B2 | 10/2014 | Qi et al. | |
| 2018/0329879 | A1 * | 11/2018 | Galitsky | G06F 40/44 |

OTHER PUBLICATIONS

Zeng—Distant Supervision for Relation Extraction via Piecewise CNN (Year: 2015).*
Nickel—A Review of Relational Machine Learning for or Knowledge Graphs (Year: 2015).*
Voskarides—Learning to Explain Entity Relationships in Knowledge Graphs (Year: 2015).*

(Continued)

*Primary Examiner* — Ying Yu Chen
*Assistant Examiner* — Shamcy Alghazzy
(74) *Attorney, Agent, or Firm* — Scully, Scott, Murphy & Presser, P.C.; Anthony R. Curro

(57) ABSTRACT

Methods and systems are described for populating knowledge graphs. A processor can identify a set of data in a knowledge graph. The processor can identify a plurality of portions of an unannotated corpus, where a portion includes at least one entity. The processor can cluster the plurality of portions into at least one data set based on the at least one entity of the plurality of portions. The processor can train a model using the at least one data set and the set of data identified from the knowledge graph. The processor can apply the model to a set of entities in the unannotated corpus to predict unary relations associated with the set of entities. The processor can convert the predicted unary relations into (Continued)

a set of binary relations associated with the set of entities. The processor can add the set of binary relations to the knowledge graph.

18 Claims, 6 Drawing Sheets

(56) References Cited

OTHER PUBLICATIONS

Ritter—Modeling Missing Data in Distant Supervision for Information Extraction (Year: 2013).*
Glass—Discovering Implicit Knowledge with Unary Relations (Year: 2018).*
Song, Y., "Machine Learning with World Knowledge: The Position and Survey", May 2017, 20 pages.
Nickel, M., "A Review of Relational Machine Learning for or Knowledge Graphs", Sep. 2015, 23 pages.
Zhang, C., et al., "Ontological Smoothing for Relation Extraction with Minimal Supervision", 2012, 7 pages.
Anonymously, "Leveraging Domain Knowledge to Create Semi-Automated Training Set for Supervised Machine Learning Classification System with Feedback Loop", May 12, 2010, 4 pages.
Anonymously, "Enhancing Relationship Extraction from the Web Using Symmetry and Inversion". Jul. 13, 2011, 7 pages.
Meji, E., "Method and System for Automatically Explaining Relationships in a Knowledge Graph", Jun. 15, 2015, 3 pages.
Anonymously, "Method and System for Creating Dynamic Ontologies and Knowledge Graphs for Search Engines", Jan. 24, 2018, 4 pages.
Glass, M., et al., "Discovering Implicit Knowledge with Unary Relations", Proceedings of the 56th Annual Meeting of the Association for Computational Linguistics (vol. 1: Long Papers), Jul. 15-20, 2018, pp. 1585-1594, Melbourne, Australia (Grace Period Disclosure).

* cited by examiner

UNARY RELATION EXTRACTION USING DISTANT SUPERVISION

STATEMENT REGARDING PRIOR DISCLOSURES BY THE INVENTOR OR A JOINT INVENTOR

The following disclosure is submitted under 35 U.S.C. 102(b)(1)(A):

Michael Glass, Alfio Gliozzo. "Discovering Implicit Knowledge with Unary Relations", *Proceedings of the 56th Annual Meeting of the Association for Computational Linguistics* (*Volume* 1: *Long Papers*), pages 1585-1594, Jul. 15-20, 2018, Melbourne, Australia.

BACKGROUND

The present application relates generally to computers and computer applications, and more particularly to machine learning systems that can be implemented to perform distant supervision learning to train a model for predicting unary relations and applying the trained model to populate a knowledge graph.

In computer science and information science, an ontology or knowledge graph can be a network including nodes and edges, where the nodes can represent concepts, data and/or entities and the edges can represent relationships between concepts, data, entities. In an example, a knowledge graph can be populated from corpus such as documents and text files by extracting relations between entities with respect to a given schema, such as types of the entities and relations between the entities.

SUMMARY

In some examples, a method for populating a knowledge graph is generally described. The method can include identifying, by a processor, a set of data in a knowledge graph. The method can further include identifying, by the processor, a plurality of portions of an unannotated corpus. A portion can include at least one entity. The method can further include
clustering, by the processor, the plurality of portions into at least one data set based on the at least one entity of the plurality of portions. The method can further include training, by the processor, a model using the at least one data set and the set of data identified from the knowledge graph. The method can further include applying, by the processor, the model to a set of entities in the unannotated corpus to predict unary relations associated with the set of entities. The method can further include converting, by the processor, the predicted unary relations into a set of binary relations associated with the set of entities. The method can further include adding, by the processor, the set of binary relations to the knowledge graph.

In some examples, a system for populating a knowledge graph is generally described. The system can include a memory and a processor comprising hardware, configured to be in communication with each other. The memory can be configured to store a knowledge graph and an unannotated corpus. The processor can be configured to identify a set of data in the knowledge graph. The processor can be further configured to identify a plurality of portions of the unannotated corpus, wherein a portion includes at least one entity. The processor can be further configured to cluster the plurality of portions into at least one data set based on the at least one entity of the plurality of portions. The processor can be further configured to train a model using the at least one data set and the set of data identified from the knowledge graph. The processor can be further configured to apply the model to a set of entities in the unannotated corpus to predict unary relations associated with the set of entities. The processor can be further configured to convert the predicted unary relations into a set of binary relations associated with the set of entities. The processor can be further configured to add the set of binary relations to the knowledge graph.

In some examples, a computer program product for populating a knowledge graph is generally described. The computer program product may include a computer readable storage medium having program instructions embodied therewith. The program instructions may be executable by a processing element of a device to cause the device to perform one or more methods described herein.

Further features as well as the structure and operation of various embodiments are described in detail below with reference to the accompanying drawings. In the drawings, like reference numbers indicate identical or functionally similar elements.

DETAILED DESCRIPTION

Knowledge graphs can be used and applied in, for example, natural language processing, data mining, semantic analysis, and machine learning applications. As the amount of data, including nodes and edges (or entities and relations), in the knowledge graph increases, an accuracy of the model can also increase. In an example, an expansion of a knowledge graph using a corpus (e.g., document, text, audio files) can include training an extraction model based on data in the knowledge graph, implementing the extraction model to identify and extract new data (e.g., new concepts, entities, and associated relations) in the corpus, and adding new nodes and edges associated with the new data into the knowledge graph.

In some example, various binary extraction techniques can be used to extract relations between entities from a corpus. However, some binary relation extraction techniques may require both entities to be nearby each other in the corpus, do not provide inference of a relation based on two fundamentally different kinds of mentions in the corpus (e.g., a portion of the corpus that mentions or includes an entity), and do not provide a feature of identifying data based on a particular relation of interest. Other approaches that considered the general distribution of a term in text to predict its type has the limitation that the representation developed cannot be adapted to different relations.

To be described in more detail below, the methods and system described in accordance with the present disclosure can be implemented to populate a knowledge graph based on unary relations instead of binary relations. For example, a system can use distant supervision to train a model under a deep learning approach. The training data being used to train the model can be a knowledge graph and an unannotated corpus. A entity detection and linking system can identify entities from the knowledge graph and link the identified entities to sections, or mentions, in the unannotated corpus. For each identified entity, the system can generate a context set that includes mentions linked to the entity (e.g. sentences or token windows). The context set can be used to form textual evidence for the model, which can be a multi-class, multi-label deep neural network. The model takes advantage of a network-in-network, which is a 1×1 convolutional neural network (CNN) adapted for natural language processing (NLP) applications. A final layer of the model can include vectors of unary relation predictions. Further, the intermediate layers of the model can be shared, such that training of the model based on unary relations can include reusing feature representations in the intermediate layers across relations as a form of transfer learning. The predictions output from the trained model can represent the probability of an input entity belonging to each unary relation.

Figure 1:
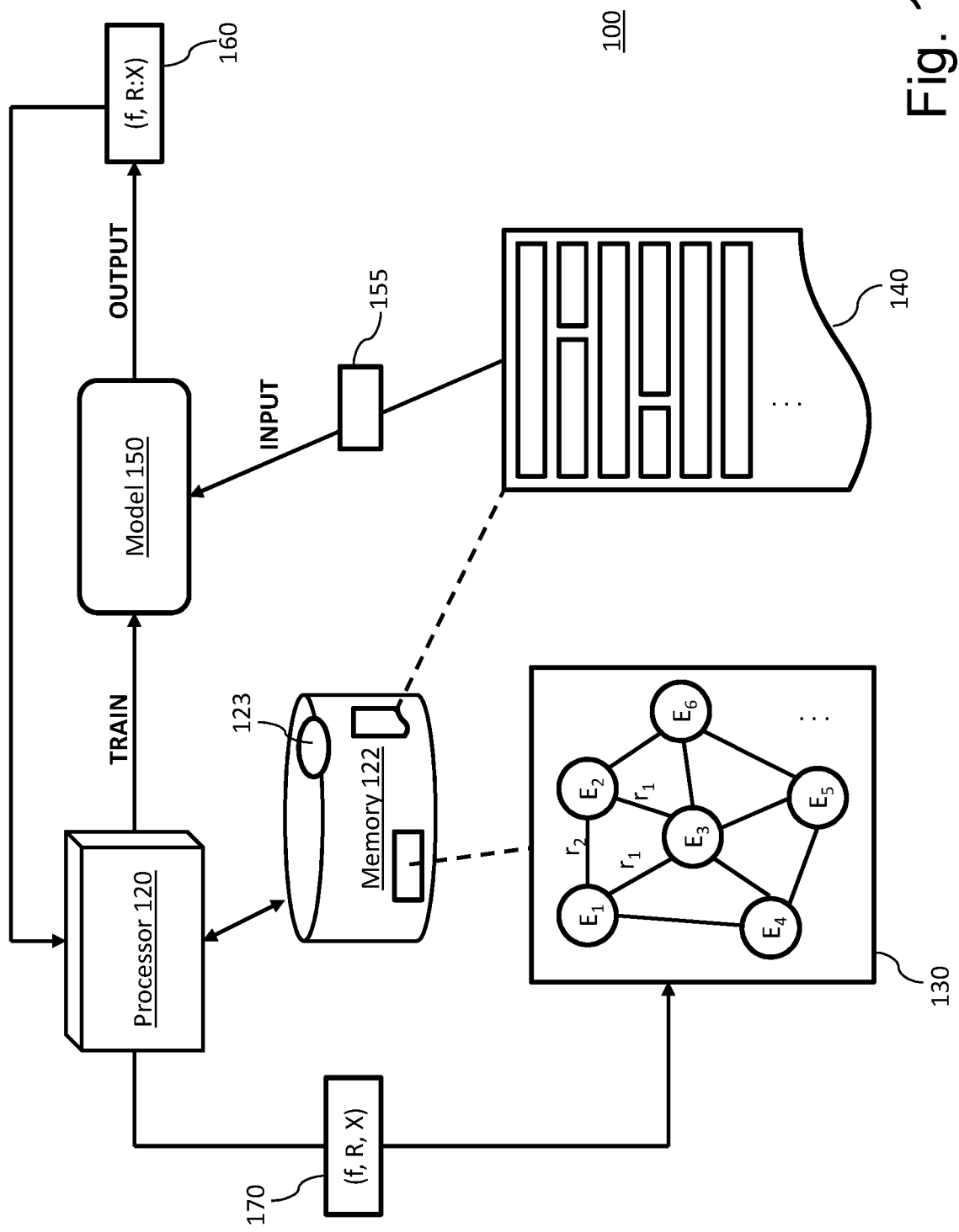
FIG. 1 is a diagram showing an example computer system that can implement unary relation extraction using distant supervision in one embodiment.

FIG. 1 is a diagram showing an example computer system 100 that can implement unary relation extraction using distant supervision in one embodiment. The system 100 can include a processor 120 and a memory 122 configured to be in communication with each other. In some examples, the processor 120 and the memory 122 can be components of a computer device such as a server, a desktop or laptop computer, and/or other types of computer devices. The memory 122 can be configured to store instructions 123, where the instructions 123 can include code, such as source code that can be compiled by the processor 120, object code resulting from compilation of source code, and/or executable code that can be run and loaded by the processor 120. The instructions 123 can be executed by the processor 120 to perform the methods described in accordance with the present disclosure. The instructions 123 can include In some examples, the processor 120 and the memory 122 can be components of a cloud computing platform.

The memory 122 can be further configured to store a knowledge graph 130 and a corpus 140. The knowledge graph 130 can be stored as a network to represent a knowledge base including structured and unstructured information. The knowledge graph 130 can include a plurality of nodes and edges. A node can represent data such as an entity or a concept, and an edge connecting two nodes can represent a relation of the two connected nodes. The corpus 140 stored in the memory 122 can be an unannotated corpus including a collection of text files that has texts, numbers, symbols. The corpus 140 can include texts representing entities that are present in the knowledge graph 130, and entities that are absent from the knowledge graph 130. In an example embodiment, the processor 120 can be configured to execute the instructions 123 stored in the memory 122 to populate or expand the knowledge graph 130 with new information, such as entities that are present in the corpus 140 but absent from the knowledge graph 130, without performing annotations on the corpus 140.

To populate the knowledge graph 130 with the new information, the processor 120 can use the corpus 140, which can include implications of entities and relations that may be included or excluded in the knowledge graph 130. The processor 120 can train a model 150, where the model 150, when applied, can predict relations between entities among the corpus 140. In a binary relation extraction approach, two arguments (or entities) can be identified from the corpus 140 and a binary relation between the two arguments can be predicted using a trained model. The two arguments and the binary relation forms a triple, which can be data including three components (the two arguments and the binary relation). Population of the knowledge graph 130 can include adding data representing entities and relations in the triple format. In an example shown in the knowledge graph 130, on FIG. 1, an entity E1 is connected to an entity E2 by an edge r2, which is indicative of E1 is related to E3 by a type of relationship defined by r1. For example, if E1 is a person and E3 is a location, then r1 defines a relationship type "location" such that a triple (E1, r1, E3) indicates "E1 is located in E3".

According to the methods and system described herein, the processor 120 can execute the instructions 123 to implement a unary relation extraction approach instead of the binary relation extraction approach. Under the unary relation extraction approach, the processor 120 can identify one argument or entity from the corpus 140 and use a model 150 to predict a unary relation for the one identified argument. In an example, a unary relation is a combination of a binary relation with a fixed argument. For example, the relation r1 in the triple (E1, r1, E3) is a binary relation relating two entities E1 and E3, and the triple (E1, r1, E3) can be transformed into unary relation format represented as ((E1, r1:E3), where r1:E3 is a unary relation is a combination of the relation r1 with the entity E3 being a fixed argument. In an example, a triple can be transformed into a unary relation by assigning a specific value to one of the two arguments in the triple to generate a fixed argument, and combining the relation with the argument assigned with the specific value. Data represented with unary relations can also be transformed, or unpacked, into a triple (or binary relation format). For example, the data (E1, r1:E3) with unary relation r1:E3 can be unpacked to the triple (E1, r1, E3) by separating relation r1 and fixed argument E3.

The processor 120 can be configured to train the model 150, under a distant supervision learning approach, with data from the knowledge graph 130 and the corpus 140 being training data. In an example, distant supervision algorithms can be based on a set of training data that includes both labeled and unlabeled data, where the labeled training data can be labeled with a relatively weak label (e.g., labels that are automatically assigned based on heuristics or rules). In an example, data from the knowledge graph 130 can be used to determine unary relations, and the determined unary relations can be used to label some of the data from the corpus 140, such that both labeled and unlabeled training data from the corpus 140 can be used to train the model 150. The model 150 can be a deep neural network that can be implemented as a multi-label (or multi-class) classifier.

In an example, the processor 120 can determine a set of unary classifiers or unary relations from the knowledge graph 130, and use the determined unary relations to label at least some of the data in the corpus 140 to generate labeled training data for training the model 150. The processor 120 can identify and extract a set of data, such as a plurality of triples, from the knowledge graph 130. In an example, Table 1 below shows a list of triples that can be identified from the knowledge graph 130:

TABLE 1

| Index | Triple |
|---|---|
| 1 | (E1, r1, E3) |
| 2 | (E2, r1, E3) |
| 3 | (E4, r1, E3) |
| 4 | (E5, r1, E3) |
| 5 | (E6, r1, E3) |
| 6 | (E7, r1, E3) |
| 7 | (E9, r1, E8) |
| 8 | (E10, r1, E8) |

The processor 120 can cluster or group triples that share a common relation and at least one common entity. Among the identified triples in Table 1, indices 1 to 6 include triples that share the relation r1 and the entity E3. The processor 120 can thus determine a unary relation of r1:E3. Similarly, the processor 120 can thus determine a unary relation of r1:E8. Note that Table 1 is merely an example, and different amount of data can be identified from the knowledge graph 130 by the processor 120. In some examples, the processor 120 can select, based on an occurrence threshold that can be defined in the instructions 123, particular determined unary relations to be used for labeling data in the corpus 140. For example, if a particular unary relation occurs only ten times among ten-thousand triples (e.g., 0.1% occurrence), and the occurrence threshold is set to 0.5%, then this particular unary relation may not be used to label the data in the corpus 140 as its occurrence rate of 0.01% is less than the occurrence threshold of 0.5%. In another example, the occurrence threshold can be set to a value, such as one-hundred occurrences, and thus, this particular unary relation may not be used to label the data in the corpus 140 as it occurred in the corpus 140 ten times (less than one-hundred times).

The processor 120 can identify a plurality of portions, or contexts, from the corpus 140. A portion of the corpus, or a context, can be, for example, a sentence, a phrase, a plurality of text, and/or a portion of the corpus 140. The processor 120 can identify contexts among the corpus 140 that mentions, or includes, the entities identified from the extracted triples in the knowledge graph 130. In some examples, the processor 120 can also identify contexts among the corpus 140 that mentioned, or includes, entities that are absent from the knowledge graph 130. The identification of contexts in the corpus 140 can be based on, for example, name-entity recognition (NER) term clustering and entity linking techniques. The processor 120 can determine whether the contexts identified from the corpus 140 can be labeled with unary classifiers determined from the knowledge graph 130. For example, a context including "E1 lives in E3" can be labeled with a unary relation r1:E3. Contexts that have no applicable unary relations can remain as unlabeled training data.

The processor 120 can cluster or group the identified portions or contexts into one or more different data sets, or context sets. For example, the processor 120 can cluster all mentions or contexts that include the entity E1 into one context set associated with E1, and can cluster all mentions or contexts that include the entity E2 into another context set associated with E2. The processor 120 can train the model 150 using the clustered context sets. Note that a context set can include both labeled and unlabeled data from the corpus 140. Training of the model 150 using the context sets will be described in more detail below. The trained model 150, when applied to an input entity, can predict a unary relation associated with the input entity. For example, the model 150 can be applied to the entity E1, and can output confidence or probabilities such as "99% r1:E3" and "1% r1:E8". The processor 120 can identify the unary relation with the highest confidence, such as r1:E3, as being associated with the entity E1. In some examples, a context set, instead of individual context, can be labeled with unary relations determined from the knowledge graph 130. The labeling of individual context or a context set can be dependent on a desired implementation of the system 100.

To populate the knowledge graph 130 with data from the corpus 140, the processor 120 can identify a set of entities 155 from the corpus 140. The set of entities 155 from the corpus 140 can include or exclude entities that were among the contexts identified for training the model 150. The processor 120 can apply the model 150 on the set of entities 155, and output a predicted unary relation for each one of the entities 155. The predicted unary relations outputted from the model 150 can be in the format (f, R;X), where f denotes a filler argument (e.g., a variable), R denotes a fixed relation (e.g., a constant relation), and X denotes a fixed argument (e.g., a constant). For example, the model 150 can output a predicted unary relation 160 with an associated entity among entities 155, such as (E20, r1:E3), where E20 can be an entity that is absent from the knowledge graph 130. The processor 120 can determine that the entity E20 is absent from the knowledge graph 130 and, in response, can unpack or convert the output 160 (E20, r1:E3) into a triple 170, with the format (f, R, X), such as (E20, r1, E3). The processor 120 can add the triple (E20, r1, E3) into the knowledge graph 130 to provide a new piece of information to the knowledge graph 130. Using a similar approach, the processor 120 can add other new entities and new relations associated with existing entities (in the knowledge graph 130) to the knowledge graph 130.

The model 150 trained under the distant supervision approach using the knowledge graph 130 and the corpus 140, can be applied by the processor 120 to predict unary relations for entities among the corpus 140. Thus, the model 150 can be applied to implement unary relation extraction instead of binary relation extraction. Unary relation extraction allows the system 100 to predict relations, such as unary relations, of one entity by identifying the one entity in a corpus that could be unannotated. Binary relation extraction may require identifying two entities and predicting relations between the two entities. Thus, the unary relation extraction approach implemented by the system 100 provides an improvement to machine learning systems, such as prediction systems, by reducing a number of operations to perform functions such as annotating a corpus and having to identify two entities for each prediction.

Figure 2:
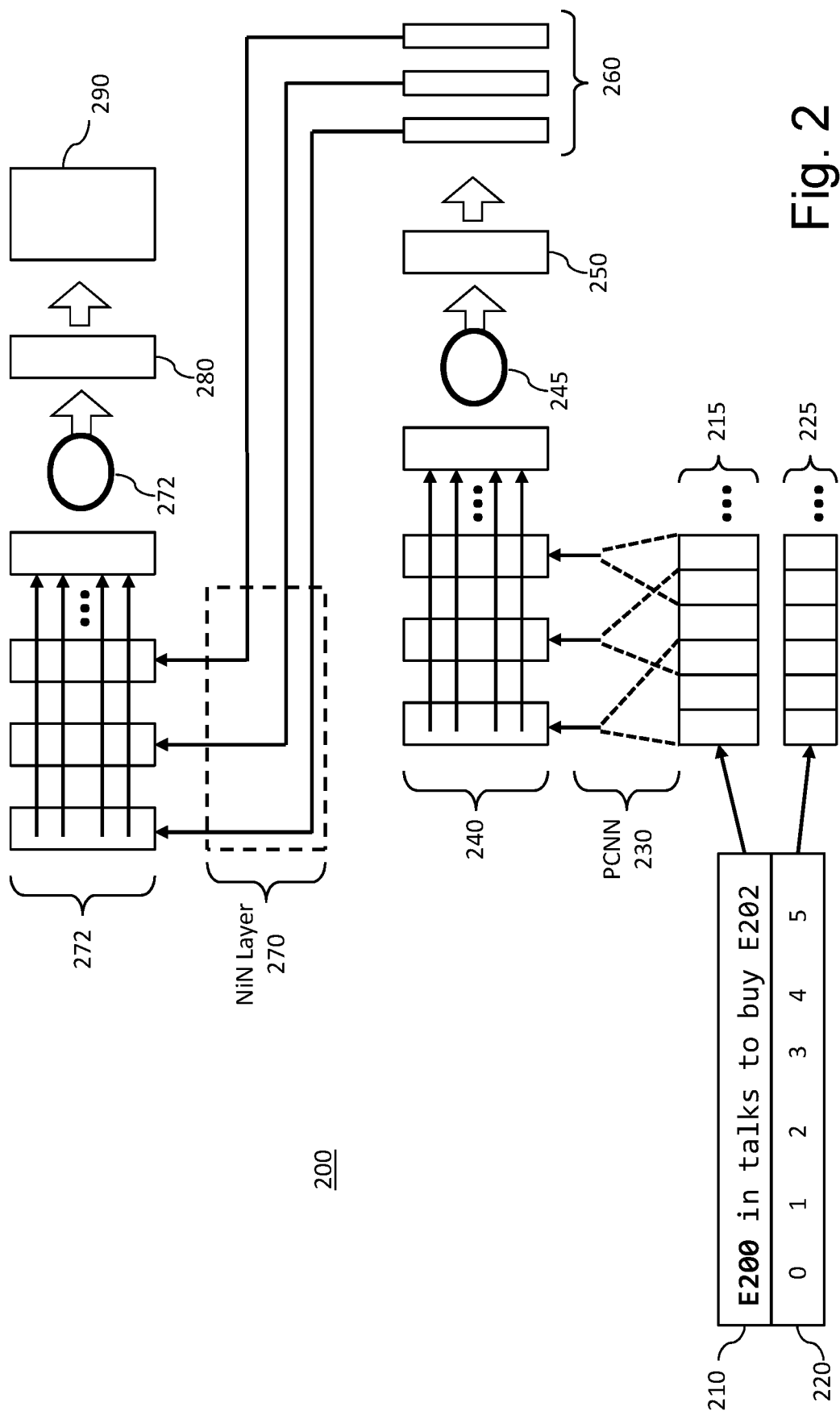
FIG. 2 is a diagram showing an example implementation of unary relation extraction using distant supervision in one embodiment.

FIG. 2 is a diagram showing an example implementation of unary relation extraction using distant supervision in one embodiment. FIG. 2 may include components that are labeled identically to components of FIG. 1, which are not described again for the purposes of clarity. The description of FIG. 2 may reference at least some of the components of FIG. 1.

To train the model 150 (shown in FIG. 1), the processor 120 (shown in FIG. 1) can identify a plurality of portions or contexts from the corpus 140 (shown in FIG. 1) and generate a plurality of data sets, or context sets, where a context set is based on a particular entity or a focus entity. For example, the entity E1 can have its context set including a plurality of contexts that mention E1, and the entity E2 can have its context set including a plurality of contexts that mention E2. The focus entity can be defined by a user of the system 100, or can be identified by the processor 120. For example, the processor 120 can search for entities that are common between the knowledge graph 130 and the corpus 140. An example deep neural network (DNN) 200 is shown in FIG. 2. A portion or context 210 can be among a context set generated by the processor 120, and the focus entity of this context set can be en entity E200. The context 210 can be, for example, a sentence mentioning or including at least one entity, such as the entity E200 and an entity E202. The entities E200 and E202 can either be included or excluded in the knowledge graph 130 (shown in FIG. 1). In some examples, a context can be duplicated by the processor 120 in response to having more than one entity. For example, the context 210 can be duplicated by the processor 120 such that a copy of the context 210 can be associated with a focus entity of E200 and the other copy can be associated with another focus entity of E202.

The processor 120 can be configured to augment the context 210 to indicate positions of objects, such as words, among the context 210 relative to a focus entity. For example, the processor 120 can be configured to perform lookup functions in a word embedding table 215 to identify a first vector, such as a context vector, where the word embedding table can be based on word embeddings such as word2vec. The word embedding table can be updated during training of the model 150. Further, the processor 120 can be configured to perform lookup functions in a position embedding table 225 to identify a second vector, such as a position vector 220, indicating positions of each object relative to the focus entity of the context 210. The processor 120 can augment the context 210 with the results from the lookup functions. For example, the processor 120 can assign position values to objects among the first vector representing the context 210. In the example shown in FIG. 2, the focus entity E200 is at position 0, and other objects among the context 210 are at different position values relative to the entity E200 at position 0. For example, the entity 202 is being augmented with a position value of 5 to indicate that the entity 202 is five positions away from the entity 200 within the context 210.

The processor 120 can concatenate the first vector (context vector representing the context 210) and the second vector (position vector 220) to produce a third vector, such as an object vector. The processor 120 can produce object vectors for other contexts that includes the entity E200 as a focus entity, and among the same context set as the context 210. The object vectors among a context set can be inputted into a piecewise max-pooled convolutional neural network (PCNN) 230. The application of the PCNN 230 on a context set including object vectors can lead to generation of a matrix, such as a context matrix 240, where the context matrix 240 can include indications of categorized positions of objects relative to the focus entity. For example, the context matrix 240 can indicate whether an object is before the focus entity, the focus entity itself, or after the focus entity, within the context 210. The processor 120 can input the context matrix 240 into an activation function 245. The activation function 245 can be, for example, a hyperbolic tangent (tanh) function, a rectified linear unit (ReLU) function, a sigmoid function, or other types of activation function. The results from the activation function 245 can be inputted into a fully connected layer 250, where the output from the fully connected layer 250 can be a fourth vector, or a context representation vector 260. The context representation vector 260 can be a projection of contexts, such as the context 210, into vector space as a result of the application of the PCNN 230. Thus, a context representation can be associated with a focus entity. For example, the entity E1 can have its own context representation, and the entity E2 can have its own context representation. In an example, the utilization of the position vector 220, which is based on one focus entity, along with the PCNN 230 and the fully connected layer 250, provides a feature of using one position vector instead of using two position vectors in binary extraction approaches such as neural relation extraction techniques.

The processor 120 can aggregate the context representation vector 260 of different focus entities, or different context sets, to predict relations between the different focus entities. The aggregation includes applying a network-in-network (NiN) layer of the DNN 200, which can be filters of a max-pooled width-1 CNN, over the context representation vectors 260 to scan the context representation vectors 260 to identify patterns of interest 272. The identified patterns 272 can be inputted into an activation function 275. The activation function 275 can be, for example, a hyperbolic tangent (tanh) function, a rectified linear unit (ReLU) function, a sigmoid function, or other types of activation function. The results from the activation function 275 can be inputted into a fully connected layer 280, where the fully connected layer 280 can include nodes corresponding to a plurality of unary relations. The fully connected layer 280 can be applied on the patterns 272 to output confidence or probabilities 290 of unary relations among the fully connected layer 280. By utilizing the NiN layer 270 to aggregate the context representations, a significant amount of contexts can be combined to produce a prediction when compared to binary relation extraction approaches.

Figure 3:
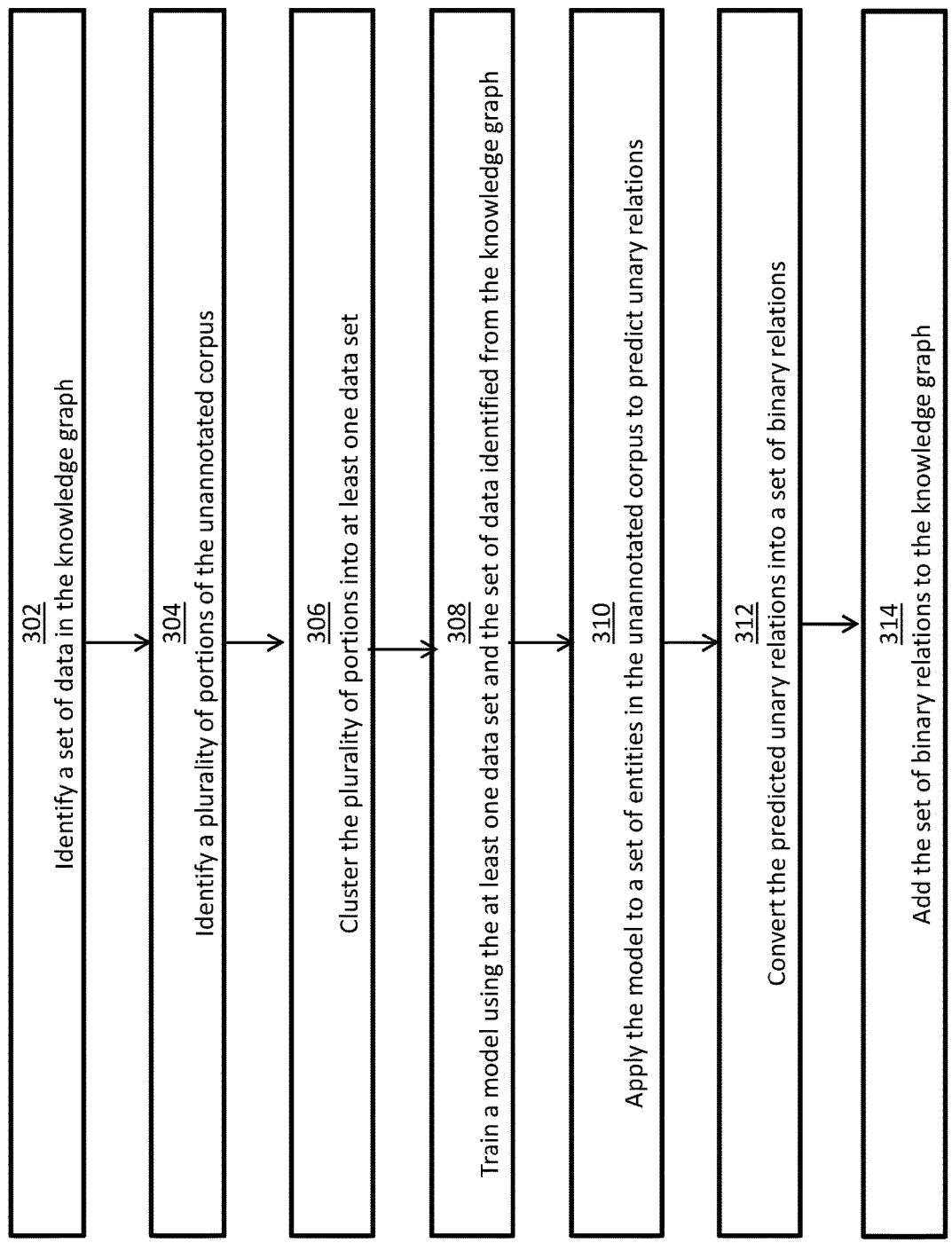
FIG. 3 is a flow diagram illustrating a process relating to unary relation extraction using distant supervision in one embodiment.

FIG. 3 is a flow diagram illustrating a process that can be performed by a processor to implement unary relation extraction using distant supervision in one embodiment. An example process may include one or more operations, actions, or functions as illustrated by one or more of blocks 302, 304, 306, 308, 310, 312, and/or 314. Although illustrated as discrete blocks, various blocks may be divided into additional blocks, combined into fewer blocks, eliminated, or performed in parallel, depending on the desired implementation. The description of the flow diagram of FIG. 3 may reference at least some of the components of FIGS. 1-2.

The process can begin at block 302, where a processor can identify a set of data in a knowledge graph. The process can continue from block 302 to block 304. At block 304, the processor can identify a plurality of portions of an unannotated corpus, wherein a portion includes at least one entity. The process can continue from block 304 to block 306. At block 306, the processor can cluster the plurality of portions into at least one data set based on the at least one entity of the plurality of portions.

The process can continue from block 306 to block 308. At block 308, the processor can train a model using the at least one data set and the set of data identified from the knowledge graph. The model can be a deep neural network including at least a piecewise convolutional neural network (PCNN) and a network-in-network (NiN) layer. The processor can train the model by identifying at least one unary relation based on the set of data identified from the knowledge graph, and labeling at least one portion among the plurality of portions with the at least one unary relation. The labeled portions can be assigned as labeled training data to train the model, and unlabeled portions can be assigned as unlabeled training data to train the model.

The process can continue from block 308 to block 310. At block 310, the processor can apply the model to a set of entities in the unannotated corpus to predict unary relations associated with the set of entities. The processor can apply the model by receiving a particular entity among the unannotated corpus, and identifying a particular unary relation among a set of unary relations defined by the model. The process can continue from block 310 to block 312. At block 312, the processor can convert the predicted unary relations into a set of binary relations associated with the set of entities. The processor can convert the predicted unary relations into the set of binary relations by separating a portion of a predicted unary relation into a binary relation and an argument. The process can continue from block 312 to block 314. At block 314, the processor can add the set of binary relations to the knowledge graph.

Figure 4:
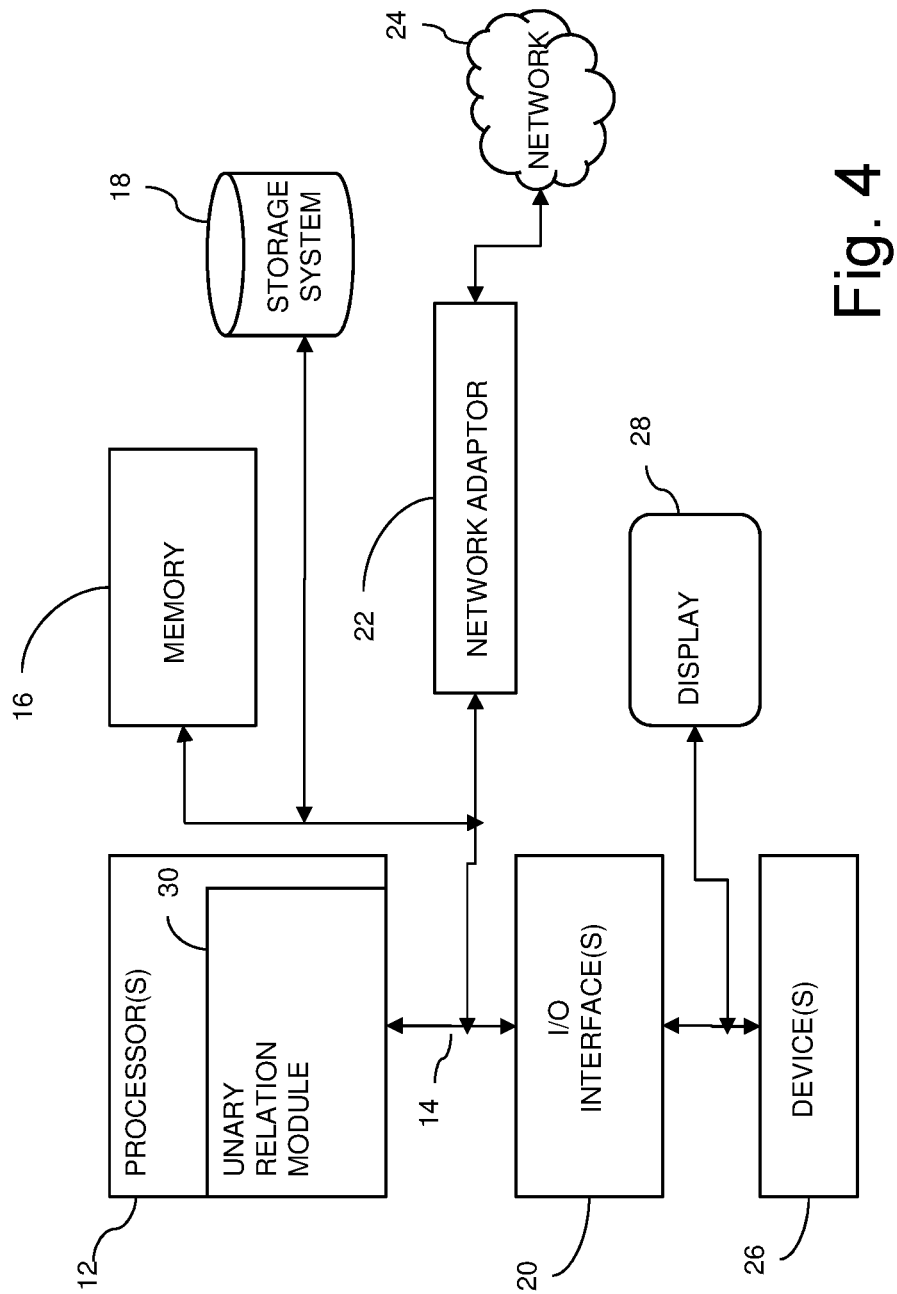
FIG. 4 illustrates a schematic of an example computer or processing system relating to unary relation extraction using distant supervision in one embodiment.

FIG. 4 illustrates a schematic of an example computer or processing system that may implement unary relation extraction using distant supervision in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 (e.g., unary relation module 30) that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 5:
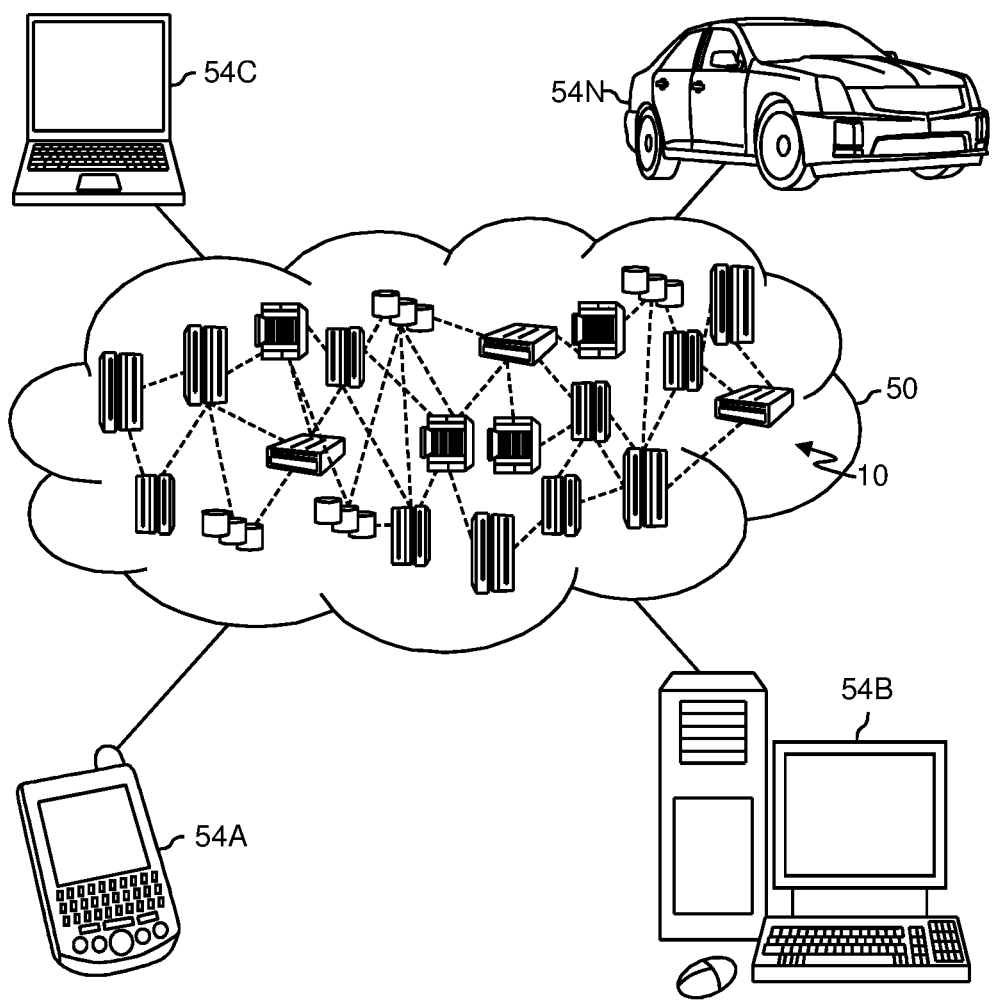
FIG. 5 depicts a cloud computing environment according to an embodiment of the present invention.

FIG. 5 depicts a cloud computing environment according to an embodiment of the present invention. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
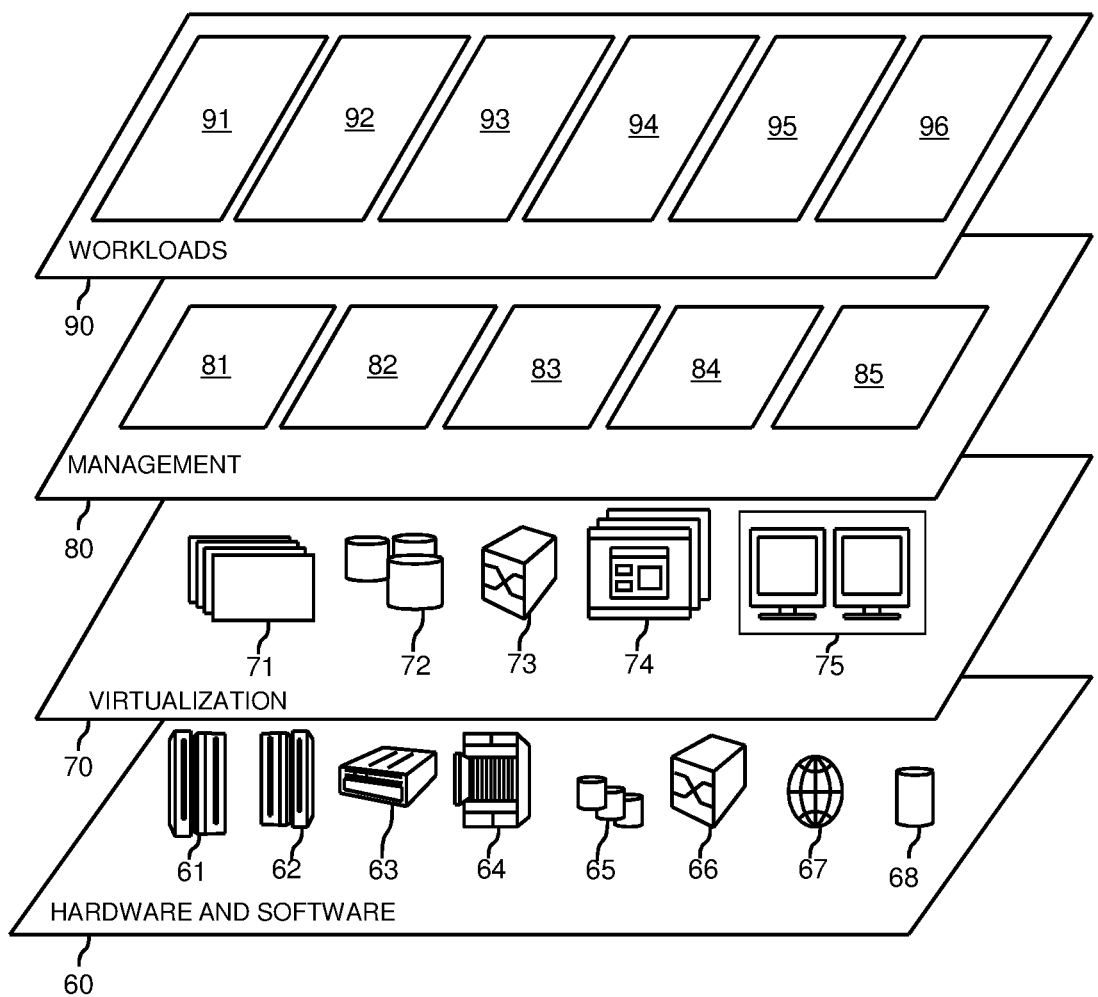
FIG. 6 depicts abstraction model layers according to an embodiment of the present invention.

FIG. 6 depicts abstraction model layers according to an embodiment of the present invention. Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and unary relation extraction 96.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
   identifying, by a processor, a set of data in a knowledge graph;
   identifying, by the processor, a plurality of portions of an unannotated corpus, wherein a portion includes at least one entity;
   clustering, by the processor, the plurality of portions into at least one data set based on the at least one entity of the plurality of portions;
   training, by the processor, a model using the at least one data set and the set of data identified from the knowledge graph, wherein the model defines a set of unary relations, and a unary relation is a combination of a binary relation with a fixed argument;
   receiving, by the processor, an input entity among the unannotated corpus;
   applying, by the processor, the model to the input entity to predict a unary relation associated with the input entity, wherein the unary relation associated with the input entity is a combination of:
      a binary relation associated with the input entity; and
      a fixed argument representing an entity among the unannotated corpus that is different from the input entity;
   converting, by the processor, the predicted unary relation into a binary relation by separating the binary relation associated with the input entity from the fixed argument in the predicted unary relation relations; and
   adding, by the processor, the separated binary relation to the knowledge graph.

2. The computer-implemented method of claim 1, wherein the model is a deep neural network comprising at least a piecewise convolutional neural network (PCNN) and a network-in-network (NiN) layer.

3. The computer-implemented method of claim 1, wherein training the model comprises:
   identifying, by the processor, at least one unary relation based on the set of data identified from the knowledge graph; and
   labeling, by the processor, at least one portion among the plurality of portions with the at least one unary relation, wherein the labeled portions are assigned as labeled training data to train the model, and unlabeled portions are assigned as unlabeled training data to train the model.

4. The computer-implemented method of claim 1, wherein training the model comprises:
   identifying, by the processor, a first vector in a word embedding table, the first vector including a plurality of objects, and the plurality of objects includes a particular entity;
   identifying, by the processor, a second vector in a position embedding table, the second vector including positions of the plurality of objects relative to the particular entity;
   concatenating, by the processor, the first vector with the second vector to produce an third vector;
   applying, by the processor, a piecewise convolutional neural network (PCNN) to the third vector to produce a matrix;
   applying, by the processor, a fully connected layer on the matrix to produce a fourth vector associated with the particular entity; and
   aggregating, by the processor, the fourth vector with other vectors associated with other entities to determine relations between the particular entity and the other entities.

5. The computer-implemented method of claim 4, wherein the aggregating comprises applying a network-in-network layer over the fourth vector and the other vectors.

6. The computer-implemented method of claim 1, wherein applying the model comprises:
   identifying among the set of unary relations defined by the model, by the processor, a particular unary relation that has a highest probability of being associated with the input entity.

7. A system comprising:
   a memory configured to store a knowledge graph and an unannotated corpus;
   a processor comprising hardware, the processor is configured to be in communication with the memory, and the processor being configured to:
      identify a set of data in the knowledge graph;
      identify a plurality of portions of the unannotated corpus, wherein a portion includes at least one entity;
      cluster the plurality of portions into at least one data set based on the at least one entity of the plurality of portions;
      train a model using the at least one data set and the set of data identified from the knowledge graph, wherein the model defines a set of unary relations, and a unary relation is a combination of a binary relation with a fixed argument;
      receive an input entity among the unannotated corpus;
      apply the model to the input entity to predict a unary relation associated with the input entity, wherein the unary relation associated with the input entity is a combination of:
         a binary relation associated with the input entity; and a fixed argument representing an entity among the unannotated corpus that is different from the input entity;

convert the predicted unary relation into a binary relation by separating the binary relation associated with the input entity from the fixed argument in the predicted unary relation; and add the separated binary relation to the knowledge graph.

8. The system of claim 7, wherein the model is a deep neural network comprising at least a piecewise convolutional neural network (PCNN) and a network-in-network (NiN) layer.

9. The system of claim 7, wherein the processor is configured to:

identify at least one unary relation based on the set of data identified from the knowledge graph; and label at least one portion among the plurality of portions with the at least one unary relation, wherein the labeled portions are assigned as labeled training data to train the model, and unlabeled portions are assigned as unlabeled training data to train the model.

10. The system of claim 7, wherein the processor is configured to:

identify a first vector in a word embedding table, the first vector including a plurality of objects, and the plurality of objects includes a particular entity;

identify a second vector in a position embedding table, the second vector including positions of the plurality of objects relative to the particular entity;

concatenate the first vector with the second vector to produce an third vector;

apply a piecewise convolutional neural network (PCNN) to the third vector to produce a matrix;

apply a fully connected layer on the matrix to produce a fourth vector associated with the particular entity; and aggregate the fourth vector with other vectors associated with other entities to determine relations between the particular entity and the other entities.

11. The system of claim 10, wherein the aggregation comprises an application of a network-in-network layer over the fourth vector and the other vectors.

12. The system of claim 7, wherein the processor is configured to:

identify, among the set of unary relations defined by the model, a particular unary relation that has a highest probability of being associated with the input entity.

13. A computer program product for populating a knowledge graph, the computer program product comprising a computer readable storage medium having program instructions embodied therewith, the program instructions executable by a processor of a device to cause the device to:

identify a set of data in a knowledge graph;

identify a plurality of portions of an unannotated corpus, wherein a portion includes at least one entity;

cluster the plurality of portions into at least one data set based on the at least one entity of the plurality of portions;

train a model using the at least one data set and the set of data identified from the knowledge graph, wherein the model defines a set of unary relations, and a unary relation is a combination of a binary relation with a fixed argument;

receive an input entity among the unannotated corpus;

apply the model to the input entity to predict a unary relation associated with the input entity, wherein the unary relation associated with the input entity is a combination of:

a binary relation associated with the input entity; and a fixed argument representing an entity among the unannotated corpus that is different from the input entity;

convert the predicted unary relation into a binary relation by separating the binary relation associated with the input entity from the fixed argument in the predicted unary relation; and add the separated binary relation to the knowledge graph.

14. The computer program product of claim 13, wherein the model is a deep neural network comprising at least a piecewise convolutional neural network (PCNN) and a network-in-network (NiN) layer.

15. The computer program product of claim 13, wherein the program instructions are further executable by the processor of the device to cause the device to:

identify at least one unary relation based on the set of data identified from the knowledge graph; and label at least one portion among the plurality of portions with the at least one unary relation, wherein the labeled portions are assigned as labeled training data to train the model, and unlabeled portions are assigned as unlabeled training data to train the model.

16. The computer program product of claim 13, wherein the program instructions are further executable by the processor of the device to cause the device to:

identify a first vector in a word embedding table, the first vector including a plurality of objects, and the plurality of objects includes a particular entity;

identify a second vector in a position embedding table, the second vector including positions of the plurality of objects relative to the particular entity;

concatenate the first vector with the second vector to produce an third vector;

apply a piecewise convolutional neural network (PCNN) to the third vector to produce a matrix;

apply a fully connected layer on the matrix to produce a fourth vector associated with the particular entity; and aggregate the fourth vector with other vectors associated with other entities to determine relations between the particular entity and the other entities.

17. The computer program product of claim 13, wherein the aggregation comprises an application of a network-in-network layer over the fourth vector and the other vectors.

18. The computer program product of claim 13, wherein the application of the model comprises identifying, among the set of unary relations defined by the model, a particular unary relation that has a highest probability of being associated with the input entity.

* * * * *